United States Patent [19]
Strenglein

[11] 3,928,800
[45] Dec. 23, 1975

[54] CALORIMETRIC RESISTANCE BRIDGES

[75] Inventor: Harry F. Strenglein, Clearwater, Fla.

[73] Assignee: Sperry Rand Corporation, New York, N.Y.

[22] Filed: June 25, 1973

[21] Appl. No.: 373,574

[52] U.S. Cl.................. 324/106; 324/95; 324/99 R
[51] Int. Cl.² ..................... G01R 5/22; G01R 21/04
[58] Field of Search.................. 324/106, 95, 99 R; 340/206

[56] References Cited
UNITED STATES PATENTS

| | | | |
|---|---|---|---|
| 2,565,922 | 8/1951 | Howard | 324/106 |
| 2,710,397 | 6/1955 | Foster | 324/99 |
| 3,048,778 | 8/1962 | Rumpel | 324/106 |
| 3,183,438 | 5/1965 | Hirsch | 324/95 |
| 3,378,828 | 4/1968 | Stark | 340/206 |
| 3,382,430 | 5/1968 | Cunniff et al. | 324/99 R |

Primary Examiner—R. V. Rolinec
Assistant Examiner—Ernest F. Karlsen
Attorney, Agent, or Firm—Howard P. Terry

[57] ABSTRACT

Calorimetrically sensitive resistance bridges are adapted for providing a read out which is a linear function of power, either in analog or digital display form, by duty cycle control of power pulses applied across the bridge for re-balancing purposes.

6 Claims, 16 Drawing Figures 3,928,800

CALORIMETRIC RESISTANCE BRIDGES

BACKGROUND OF THE INVENTION

1. Field of the Invention

The invention pertains generally to bridged resistor types of thermally sensitive measurement equipment and more particularly relates to calorimetrically sensitive resistance bridges adapted for providing a read out which is a substantially linear function of power, either in analog or digital form. Duty cycle control of power pulses is used for effecting bridge re-balance.

2. Description of the Prior Art

In conventional calorimetrically sensitive resistance bridges, the calorimetric condition of a thermally sensitive element is often varied by the direct effects upon it of factors to be measured, such as the power in a radio frequency field, as in microwave wattmeters, or by the effects of the velocity or conductivity of a liquid or gas in which the thermally sensitive element is immersed, as in fluid velocimeters and in fluid thermal conductivity measurement apparatus. However, the re-balancing power that must be applied to the bridge after radio frequency power to be measured is coupled to it, for instance, is always a function of the square root of the power being measured. A non-linear circuit must therefore be used if a linear read out of the balancing power is to be provided. Such circuits are generally less accurate than linear circuits.

Furthermore, in such prior art calorimetrically sensitive resistance bridges, the measurement is generally dependent on the actual temperature of a heated thermally sensitive element and there must be provided a correction for the ambient temperature situation. This is usually accomplished by placing a second sensitive element substantially in the same field of action, but protected from the effect actually to be measured, such as a radio frequency field to be measured or the flow of a fluid. If it is desired to operate over a reasonable range of ambient temperatures, the two sensitive elements must be closely matched and geometrically close to each other so that changes in ambient temperature do not produce spuriously derived temperature differences, thus destroying the calibration of the display.

SUMMARY OF THE INVENTION

The present invention provides in one embodiment novel means in a calorimetrically sensitive bridge for providing a read out which is intrinsically a linear function of power, either in analog or digital display form. According to the invention, a sensitive bridge is provided in which bridge re-balance is effected by duty cycle control of pulsed power applied across the bridge for that purpose.

Further, the invention provides in an additional embodiment measurement of radio frequency power, fluid velocity, or the like by measuring the dissipation constant of a sensitive thermal resistor through periodically changing the temperature of the sensing resistor between finite levels and noting the power used in the periodic steps required to increase its temperature.

DESCRIPTION OF THE PREFERRED EMBODIMENTS

Figure 1:
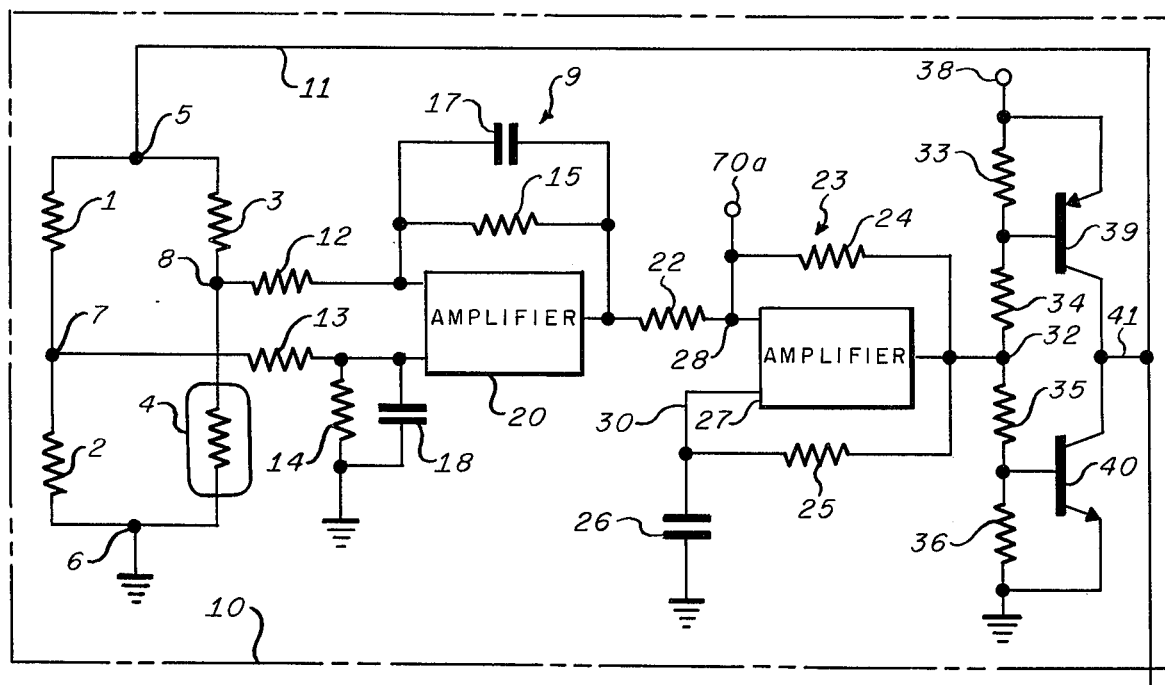
FIG. 1 is a wiring diagram of a preferred form of the invention.
Figure 1:
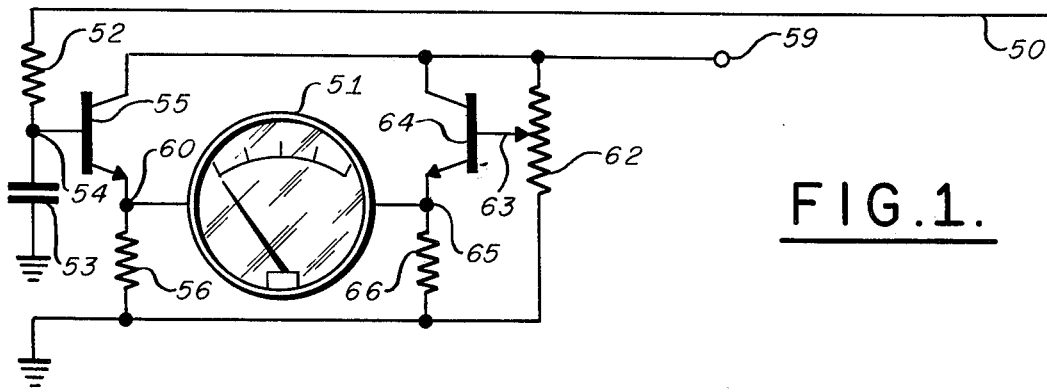

Referring to FIG. 1, resistors 1, 2, and 3 and the sensing resistor 4, which may be a conventional thermistor, barretter, or other thermally sensitive resistance element, form a resistance bridge circuit having paired junctions 5, 6 and 7, 8, the bridge being a portion of the calorimetric condition sensor circuit 10. A feed back signal is applied via lead 11 across the calorimetric condition bridge between the paired junctions 5 and 6, junction 6 being grounded. Unbalance outputs are conducted from the paired junctions 7 and 8 through series isolating resistors 12, 13 to the low pass filter circuit 9 comprising resistors 12, 13, 14, and 15 and capacitors 17 and 18 associated with amplifier 20. The low pass network 9 provides a stabilizing feed back connection through resistor 15 and capacitor 17 for stabilizing the gain of amplifier 20, which may be a conventional operational amplifier.

The output of amplifier 20 is coupled via isolating resistor 22 and junction 28 to an astable multivibrator circuit 23. Astable multivibrator 23 is built around operational amplifier 27, which latter amplifier utilizes a resistor 24 connecting its output junction 32 to input junction 28. The output of amplifier 27 is coupled through resistor 25 to a second input lead of amplifier 27, which latter resistor is also coupled to ground through condenser 26. Astable multivibrator 23 is characterized as having a period only moderately altered by changes in the magnitude of the output of amplifier 20. On the other hand, the symmetry of its generally rectangular output wave (the ratio of its on to off time) is strongly affected in conventional manner by the magnitude of the output of amplifier 20.

The output of multivibrator 23 is fed to the center point junction 32 of a voltage divider arrangement consisting of the series connected resistor 33, 34, 35, and 36. These latter resistors are connected between ground and a terminal 38 to which a power source (not shown) is normally coupled. The series resistors 33, 34, 35, and 36 and transistors 39 and 40 coupled across them cooperate to form a conventional saturating amplifier, the base of transistor 39 being coupled to the junction between resistors 33, 34 and the base of transistor 40 being coupled to the junction between resistors 35, 36. The output of amplifier transistors 39, 40 is taken at junction 41 and has substantially the same wave form as the output of multivibrator 23; however, because of the low saturation resistances of transistors 39, 40, the output at junction 41 is a generally rectangular wave whose excursion is substantially equal to the unidirectional supply voltage at terminal 38. The variable duty cycle voltage at terminal 41 is fed back via lead 11 to the bridge junction 5 as primary power for re-balancing the bridge.

The variable duty cycle, generally rectangular wave of junction 41 is also coupled via lead 50 to the input circuit for meter 51, which input circuit includes resistor 52 and capacitor 53 connected to ground. The junction 54 common to elements 52, 53 is connected to the base of emitter follower transistor 55, whose collector is connected to terminal 59 and whose emitter is connected through resistor 56 to ground. The same unidirectional voltage source as is connected to terminal 38 may be connected to terminal 59. The junction 60 common to emiter follower transistor 55 and resistor 56 is connected to the electrical meter or other conventional display 51.

Power supply terminal 59 is coupled to the collector electrode of a second emitter follower transistor 64 and also through tap 63 of potentiometer 62 to the base of emitter follower transistor 64. Its emitter is connected through resistor 66 to ground and to the second terminal of meter 51. The voltage magnitude at terminal 63 serves as a reference voltage level. The generally rectangular wave output from junction 41 is averaged by the input circuit including resistor 52 and capacitor 53 for comparison by meter 51 with the reference signal from terminal 59 and tap 63. The potentiometer tap 63 connected to the base of transistor 64 is used for zero adjustment of meter 51.

It will be seen that the embodiment of FIG. 1 maintains the balance of the bridge comprising resistors 1, 2, 3, 4, by varying the duty cycle of the constant amplitude generally rectangular wave generated at junction 41. Accordingly, the average power as indicated by meter 51 is advantageously a linear function of the average voltage placed across the bridge comprising resistors 1, 2, 3, 4. The thermistor 4 is generally heated or cooled according to a parameter which is to be measured, such as a radio frequency power level, the temperature or conductivity of a fluid, its rate of flow, or according to other calorimetric conditions of thermistor 4. When sensor element 4 is a thermistor or barretter for the measurement of the power level of microwave energy, for example, the sensor circuit 10 of FIG. 1 produces a display on meter 51, the amplitude of which is advantageously a linear function of the microwave power absorbed by sensor element 4, thereby eliminating the expense and error characteristic of the prior art conventional squaring circuit that would otherwise be needed in order to attain a linear display of the absorbed power on meter 51.

Figure 2:
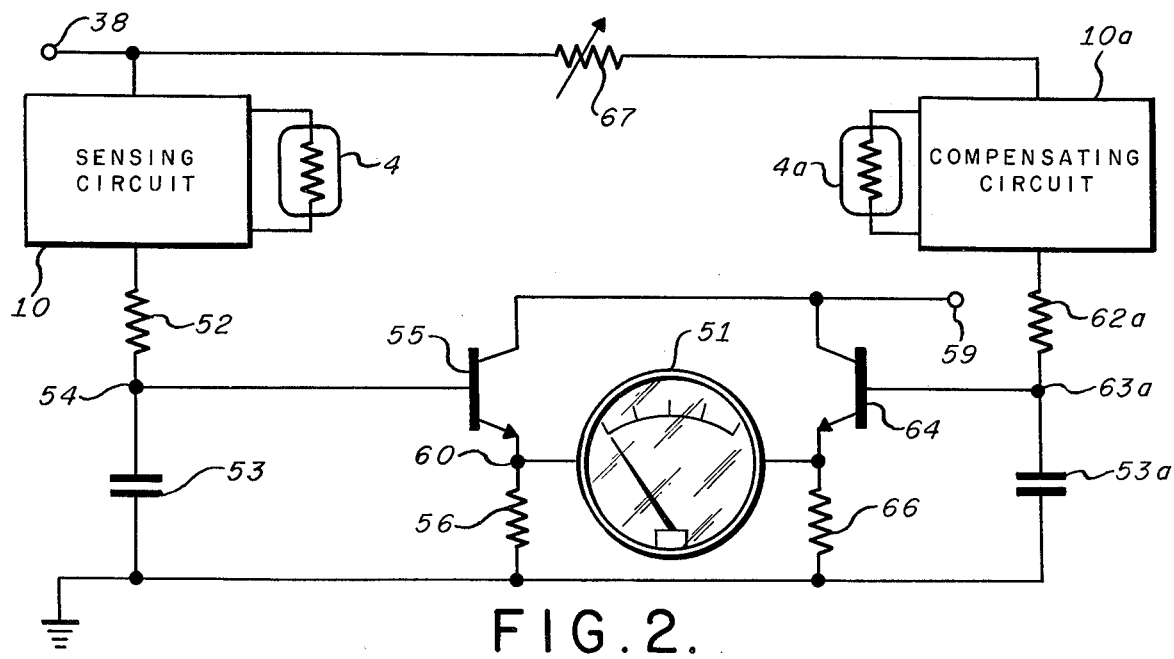
FIG. 2 illustrates a wiring diagram of a modification of the invention of FIG. 1.

Instead of using the pwer supply or battery reference voltage or signal associated with the battery at terminal 59 and with transistor 64 of FIG. 1, the automatic temperature compensating arrangement of FIG. 2 may be used. The sensing circuit 10 may be generally the same as the sensing circuit 10 of FIG. 1. If the meter 51 is to indicate the power level of a radio or high frequency signal, for example, a sensor 4 like sensor 4 of FIG. 1 may be exposed in sensing circuit 10 to the energy to be measured. A second circuit 10a exactly like circuit 10 may be used as a temperature compensating circuit; circuit 10a contains a thermistor 4a or other sensor like sensor 4 of FIG. 1, but it senses the ambient temperature only, and is shielded from radio or high frequency energy, for example. The output of compensating circuit 10a is fed through the series connected resistor 62a and condenser 53a to ground. The tap 63a between elements 62a and 53a supplies the base of transistor 64, transistor 64 being connected in circuit with meter 51 generally as in FIG. 1. The power source coupled to terminal 38 may be connected directly to sensing circuit 10 and in an analogous manner to the compensating circuit 10a of FIG. 2. If desired, an adjustable resistor 67 may be inserted between terminal 38 and the compensating circuit 10a; the meter 51 may be zeroed by adjustment of resistor 67.

Figure 3:
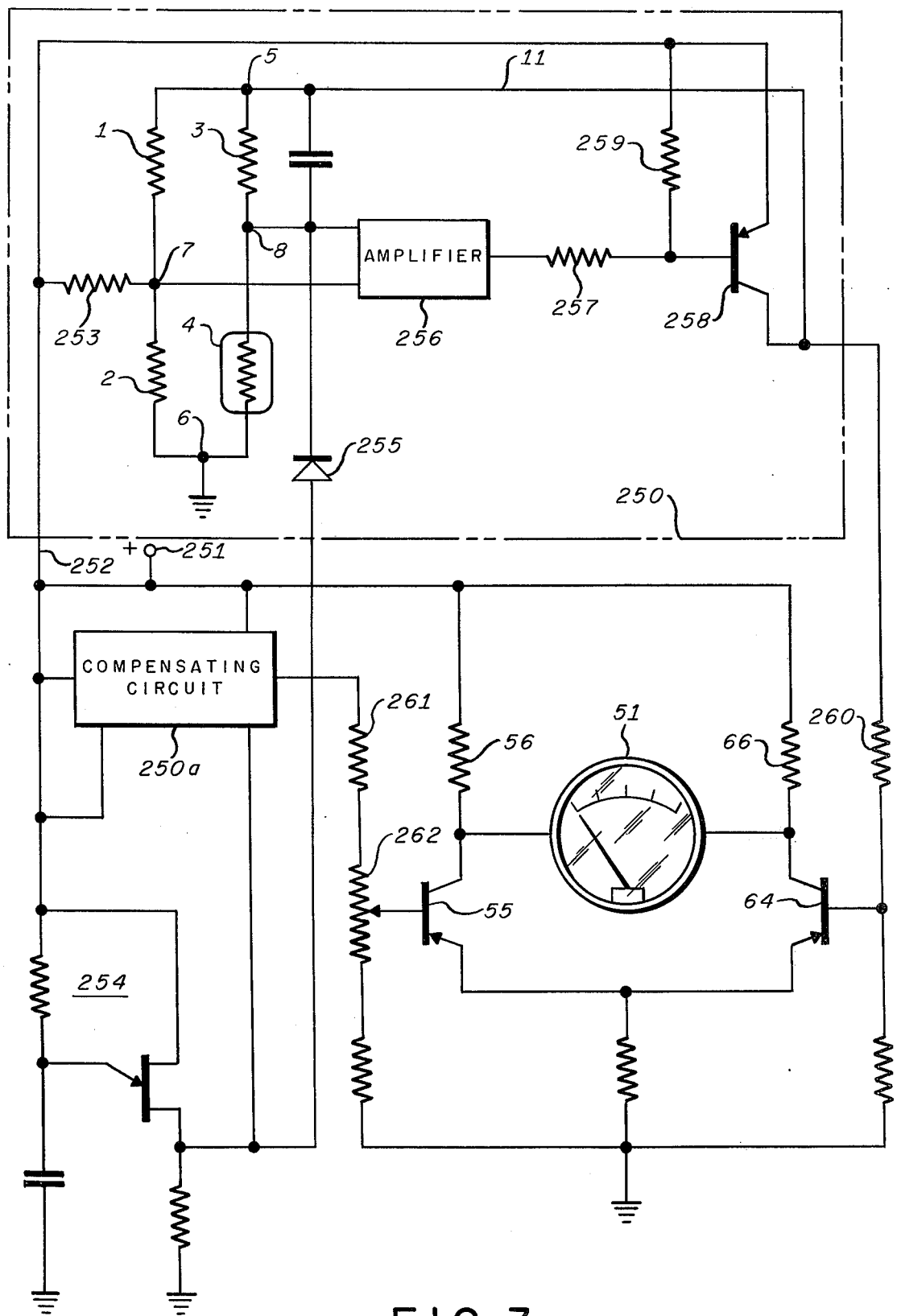
FIG. 3 illustrates a circuit combining features of FIGS. 1 and 2.

The arrangement of FIG. 3 is related to that of FIG. 2 in that it comprises a similar purpose pair of bridges with a common indicator 51. The individual sensing bridges 250 and 250a of FIG. 3, however, are variations of those of FIG. 1 in that the functions of the astable multivibrators and the error amplifier of FIG. 1 have been combined by a particular use of the thermal time constant of the thermistors or other thermal sensors. As in FIG. 2, it will be understood that the sensing circuit 250 and the compensating circuit 250a of FIG. 3 are actually duplicate circuits, so that both may be explained with reference, for example, to the sensing circuit 250. Each such circuit has a temperature sensing bridge composed of resistors 1, 2, 3, and 4, as before, both being coupled to a common power supply (not shown) coupled by lead 252 at terminal 251 and connected via resistor 253 at the bridge junction 7. The opposed bridge junction 8 is supplied via diode 255 with a train of discrete pulses by a conventional trigger pulse generator 254. A feed back connection 11, as before, couples the output of the following amplifier circuit 256 to junction 5 of the bridge, the output at bridge junction 8 being supplied through differential amplifier 256 and resistor 257 to transistor 258. Feed back lead 11 is supplied by transistor 258, which transistor also provides the output of the sensor circuit 250 via resistor 260 as one input for an indicator meter 51 substantially similar in operation to the indicator 51 of FIG. 2.

As noted above, the compensating circuit 250a is substantially similar to the temperature or power sensing circuit 250, having similar input and output connections, but supplying its output via resistor 261 and zero centering potentiometer 262 to the second input of meter 51. The operation of meter 51 and its input circuits associated with transistors 55 and 64 being analogous to the operation of meter 51 and its associated circuit elements in FIG. 2, operation of the system will be apparent by considering for purposes of explanation only the sensor bridge 250. First assume that the circuit has been quiescent for a sufficiently long time that the resistance of thermistor or other sensor 4 is only slightly above the value for achieving actual balance of bridge 1, 2, 3, 4. When a positive pulse is received at bridge junction 8 from trigger pulse generator 254, amplifier 256 is forced to supply substantially maximum power via feed back 11 to the bridge 1, 2, 3, 4. Because of the sense of the consequent unbalance of bridge 1, 2, 3, 4, the feed back level is maintained until the thermal sensor 4 causes the bridge to approach true balance, at which time amplifier 256 becomes unsaturated. The decrease in voltage at bridge junction 5 is then coupled to the input of amplifier 256 via capacitor 263. Consequently, a regenerative feed back situation is then set up, and the signal at bridge junction 5 is forced to zero. This condition is maintained by injecting a very small input into one side of bridge 1, 2, 3, 4, via resistor 259. The latter input is large enough to overcome any drift of amplifier 256, but not so large that the next trigger pulse from generator 254 can not play its perturbing role. With an identical bridge used in the compensating circuit 250a, operation is generally the same as in FIG. 2, except as varied by the normally varying parameters of the thermal sensor 4 in sensing circuit 250 and its counter part in compensating circuit 250a.

Figure 4:
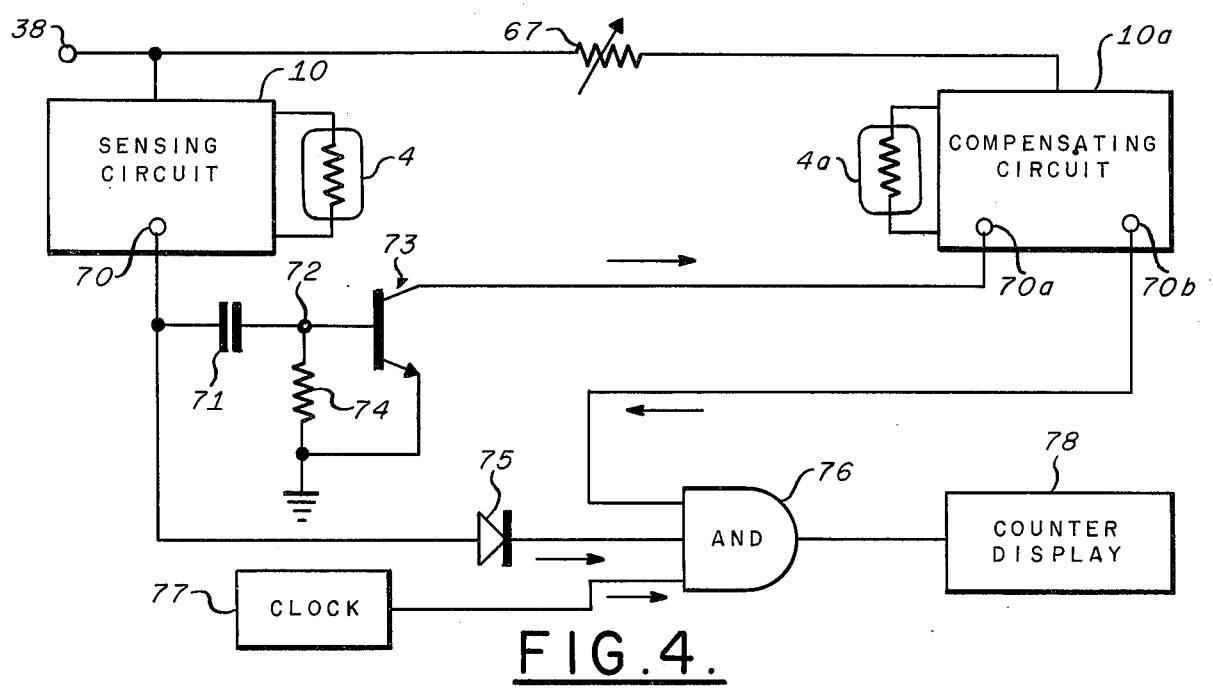
FIG. 4 is a wiring diagram of a further variation of the embodiments of FIGS. 1 and 2 adapted to provide a digital display.

As will be discussed in connection with FIG. 4, the dual bridge system of FIG. 2 has the additional advantage that a digital read out may be arranged instead of or to supplement the analog display 51. Then sensing circuit 10 and compensating circuit 10a of FIG. 4 are arranged normally to be supplied from a power source at terminal 38, as before. The output of circuit 10 is coupled from terminal 70 through capacitor 71 and junction 72 to the base of the amplifier transistor 73. Junction 72 is coupled through resistor 74 to ground, so that capacitor 71 and resistor 74 form a differentiating circuit. The collector of transistor 73 is coupled to a terminal 70a in compensating circuit 10a analogous to terminal 70a in FIG. 1; on the other hand, the emitter of transistor 73 is connected to ground. The output of the calorimetric condition sensing circuit 10 is further connected through a conventional logic inverter diode 75 to a first input of AND circuit 76, while the output of compensating circuit 10a is coupled directly from terminal 70b to a second input of AND circuit 76. The third input to AND circuit 76 is supplied by a conventional digital clock circuit 77 and the output of AND circuit 76 may be received by a display such as a conventional counter display 78.

In operation, the differentiation circuit comprising capacitor 71 and resistor 74 of FIG. 4 supplies timing control signals for self-synchronizing the instrument. It will readily be seen that the sensor bridge 10, to which the microwave power or other calorimeter condition perturbing influence is to be exercised in sensor 4, will inherently have a shorter conduction period than the compensating bridge 10a. Thus, the differentiating network 71, 74 and amplifier transistor 73 are controlled by the generally rectangular wave output of bridge 10 for purposes of synchronization, the amplified synchronizing pulses being fed to astable multivibrator circuit terminal 70a in the compensating circuit 10a. Accordingly, the positive-going fronts of the outputs of the two bridge circuits 10 and 10a are synchronized.

For operating the digital counter display 78, three inputs are used to control operation of the AND circuit 76. The first of these is the output of the conventional clock circuit 77. The variable conductive duration rectangular wave output of sensing circuit 10 is applied through the logic inverter diode 75 to a second input of AND circuit 76, while the reference rectangular wave output of compensating circuit 10a is coupled to the third input of the AND circuit 76. In practice, the pulse train output of clock 77 and the rectangular wave outputs of circuits 10 and 10a will have periods short compared to that of the desired read-out period of counter display 78. Zero setting of the display system of FIG. 4 may be accomplished manually as in FIGS. 1 and 2, or known automatic circuits may be employed in a manner evident to those skilled in the art.

It will further be understood by those skilled in the art that the principles of the present invention may be used for detecting a variety of calorimetric conditions, such as the calorimetric condition of a resistor or other impedance element whose calorimetric condition is determined by the velocity of a liquid or of a gas in which the sensor is immersed or the thermal conductivity of such fluids. It is advantageous in such applications to employ the present invention, for example, for providing a linear analog or other linear read out facility. Further, in such devices as prior art marine speedometers, fluid flow meters, and thermal conductivity meters for fluids, it has been customary to incorporate a second thermally responsive reference element in the system for providing for ambient temperature compensation. This has often been accomplished by actually placing a second thermally responsive element in the fluid, but protected from the effects of fluid presence relative to it. For precise operation over a range of ambient temperatures, the calorimetric condition sensor and the reference sensor must be closely matched in such prior art systems, or changes in ambient temperature might otherwise produce spurious indications of the values of fluid velocity or thermal conductivity.

According to a further aspect of the present invention, the requirement for the ambient reference element in a quiescent part of the fluid is eliminated, consequently removing the need for a reference element closely matching the calorimetric condition sensing element over a considerable ambient temperature range. In operation, the embodiment benefits from the fact that, as in the aforedescribed novel devices, the display is actually indicating the change in the thermal energy dissipation characteristics of the element exposed, for instance, to a moving fluid. This change in the thermal energy dissipation characteristic, it is found, may be measured independently of both the ambient temperature and the exact rise in temperature of the calorimetric sensitive element above the ambient temperature.

Figure 5:
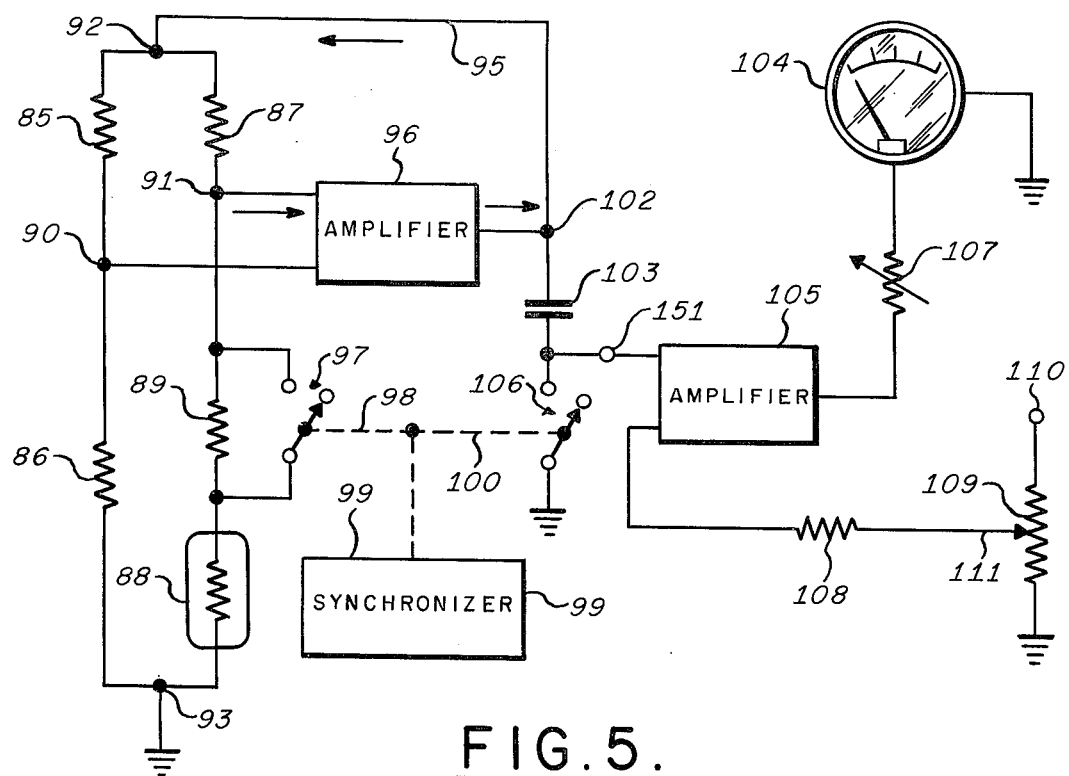
FIGS. 5 and 6 are wiring diagrams of further embodiments of the invention.

FIG. 5 illustrates the basic features of this aspect of the invention. A bridge circuit is formed of resistors 85, 86, and 87 having one leg including a resistor 89 and a thermistor or hot wire element 88. The bridge has junctions 90, 91, 92, and 93 connecting its several arms; terminals 90 and 91 are output terminals, terminal 92 is a feed back input, and terminal 93 is coupled to ground. The unbalanced or output signal of the bridge is coupled from terminals 90 and 91 to amplifier 96, which amplifier may be generally similar to amplifier 20 of FIG. 1. The output of amplifier 96 is coupled by lead 95 to the bridge feed back terminal 92. If the gain of amplifier 96 is reasonably high and if normal precautions are taken to prevent undesired oscillation of the system, amplifier 96 will supply sufficient energy to the bridge and particularly to sensor 88 that the bridge will automatically re-balance, as in conventional practice.

In the system of FIG. 5, the relatively small auxiliary resistor 89 in the same arm as sensor 88 may be switched in and out of circuit by the regular closing and opening of switch 97. While switch 97 is shown as being operated by a mechanical link 98 under control of synchronizer 99, it will be understood that an electrically operated switch 97 will be used in most practical applications. Synchronizer 99 operates at a rate low enough that the bridge comprising resistors 85, 86, 87, 88, and 89 may return fully to its balanced condition each time after switch 97 is opened or closed. It will therefore be apparent that the bridge sensor resistor 88 must come to a first temperature level when switch 97 is closed and to a second temperature level when switch 97 is open. As a consequence, the output of amplifier 96 has a generally rectangular wave form, with voltage changes occurring synchronously with the operation of switch 97. The amplitude of the change in the generally rectangular wave has a direct relation to the amount of power instantaneously required to shift the bridge balance between the temperature conditions or levels of sensor element 88.

Furthermore, the generally rectangular wave output signal at terminal 102 has a differential excursion which is instantaneously generally proportional to the thermal energy dissipation characteristic of sensor element 88 and this function changes, for example, as the velocity of a fluid flowing over sensor 88 changes. The change is to be displayed by meter 104; for this purpose, the output at terminal 102 is coupled as a wave alternating about zero volts through capacitor 103 to a synchronous switching detector represented by switch 106. Switch 106 is driven via linkages 98 and 100 in synchronism with switch 97, alternately coupling one side of capacitor 103 to one input of the output amplifier 105 and then to ground. The output of amplifier 105 is coupled to direct current meter 104 through scale factor adjustment resistor 107. A second input to amplifier 105 is connected through resistor 108 from the tap 111 of potentiometer 109. Potentiometer 109 is normally coupled at terminal 110 to a voltage source (not shown) and is grounded at its opposite end; the circuit associated with potentiometer 109 serves as a zero-set agency.

Figure 6:
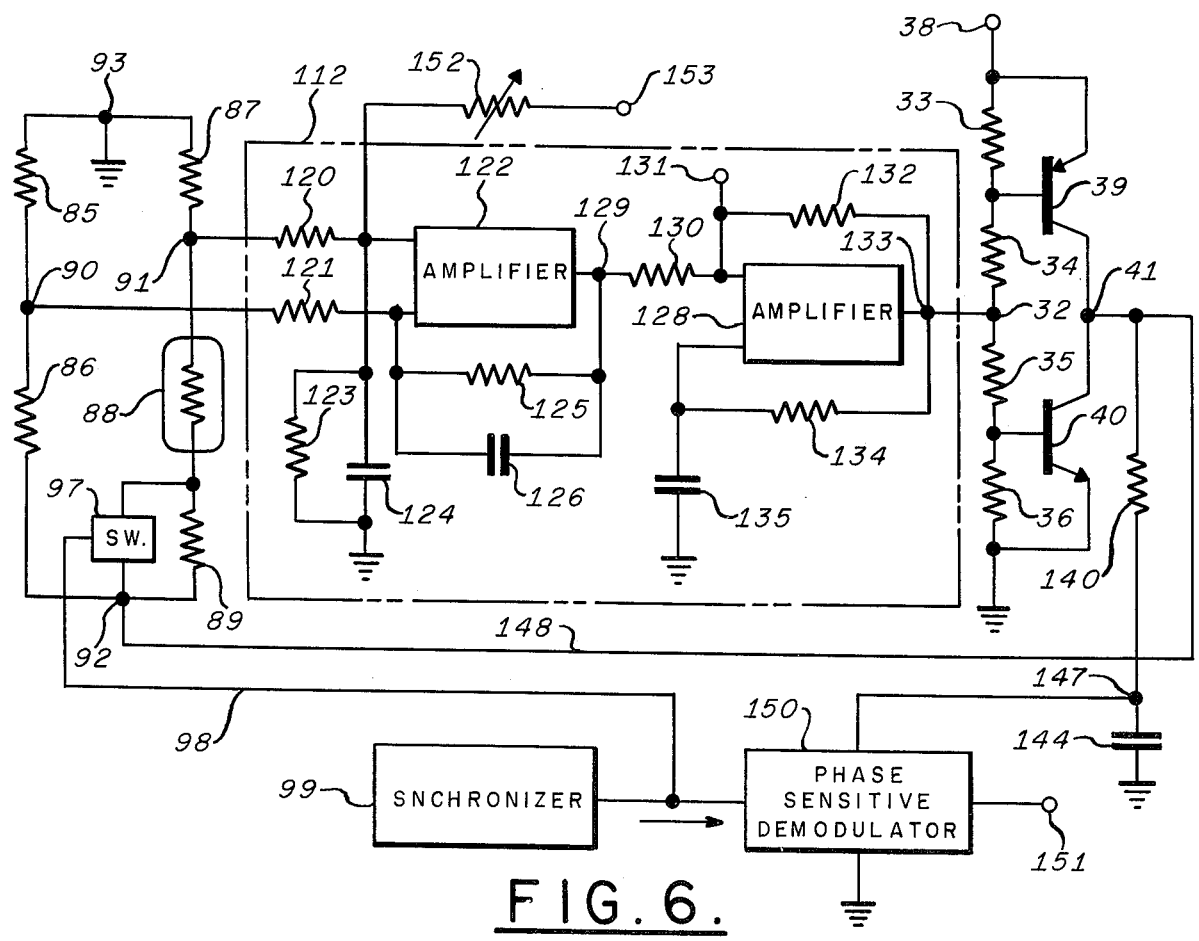

The variation of the foregoing embodiment illustrated in FIG. 6 provides further beneficial compensating features. For example, in the arrangement of FIG. 5, the power supplied across sensor element 88 is not actually proportional to the voltage supplied across the bridge at terminals 92 and 93, but is in proportion to the square of that voltage. Consequently, the signal supplied to meter 104 is affected by ambient temperature variations so that the display by meter 104 is not fully precise. The seat of the problem lies in the fact that, in FIG. 5, the initial value of the signal voltage at terminal 102 varies with the ambient temperature. The display of meter 104 may be made precise by replacing the amplifier 96 of FIG. 5, with the rebalancing circuit 112 of FIG. 6.

In FIG. 6, elements 85, 86, 87, 88, 89, 90, 91, 92, 93, 97, and 99 are similar to the correspondingly numbered elements of FIG. 5. The bridge output terminals 90, 91 are respectively coupled through isolating resistors 120, 121, to inputs of a conventional operational amplifier 122. The input associated with coupling resistor 120 is coupled to ground through parallel connected resistor 123 and capacitor 124, while the output of amplifier 122 is connected through parallel connected resistor 125 and capacitor 126 to the amplifier input associated with input coupling resistor 121. It will be recognized by those skilled in the art that such a circuit configuration with proper parametric values will permit amplifier 122 to function as a differential amplifier for amplifying the bridge output signal received through resistors 120 and 121. Capacitors 124 and 126 are selected substantially to eliminate signals of the same frequency as the frequency of operation of the following astable multivibrator constructed around amplifier 128, amplifier 128 being similar in function and connection to amplifier 27 of FIG. 1.

Terminal 129 is connected through coupling resistor 130 to one input of amplifier 128, which input is also coupled in feed back relation through resistor 132 from the output terminal 133 of amplifier 128. Terminal 133 is also coupled through a resistor 134 to a second input of amplifier 128, and is further coupled to ground through capacitor 135. The circuit arrangement associated with amplifier 128 permits it to operate in a conventional manner as an astable multivibrator whose period is preferably only slightly affected by the voltage at terminal 129, but whose ratio of on-to-off time is sharply a function of that voltage.

The voltage wave at output terminal 133 is coupled to the center point junction 32 of a voltage divider arrangement consisting of the series connected resistors 33, 34, 35, and 36. The series resistors and transistors 39 and 40 serve as they did in FIG. 1 to form a conventional saturating amplifier, the base of transistor 39 being coupled to the junction between resistors 33 and 34, and the base of transistor 40 being similarly coupled to the junction between resistors 35 and 36. The output of amplifier transistor 39, 40 is taken at junction 41 and has substantially the same generally rectangular wave form as the output of multivibrator 128.

Output terminal 41 is coupled directly by lead 148 to the bridge terminal 92 and is also coupled through resistor 140 and capacitor 144 to ground. Resistor 140 and capacitor 144 form a filter whose time constant is short compared to that of thermistor 88, but long compared to the multivibrator repetition interval. The circuit associated with transistors 39 and 40 serves as a driver circuit via lead 148 providing a re-balancing voltage wave form to terminal 92 of the bridge. The ratio of the on-to-off times of the re-balancing voltage varies, as in the circuit of FIG. 5, in such a way as to keep the bridge substantially balanced. Provided that the basic repetition rate of the astable multivibrator circuit associated with amplifier 128 is high compared to the time constant of the thermistor or other sensor 88, the power supplied to the bridge during the "on" time in constant, while the total power applied to the bridge is linearly proportional to the average voltage of the generally rectangular wave appearing at terminal 147. As a consequence, the alternating wave form appearing at junction 147, as the bridge balance shifts, is substantially independent of bridge balancing power changes and represents the desired precise analog of the changing dissipation constant of sensor 88. The output at junction 147 may be supplied to a phase sensitive demodulator circuit 150 analogous to the switch 106 of FIG. 5, and driven by synchronizer 99 which also drives switch 97. The output of phase sensing demodulator 150 as derived at terminal 151 may be coupled to an amplifier 105 and a display such as the meter 104 of FIG. 5.

Figure 7:
FIGS. 7 and 8 are graphs showing wave forms useful in explaining operation of the invention.
Figure 8:
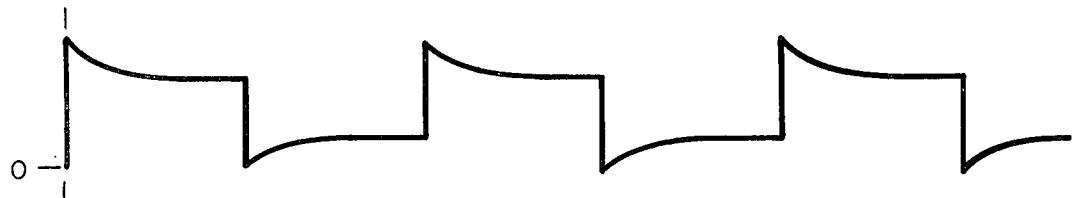
Figure 9:
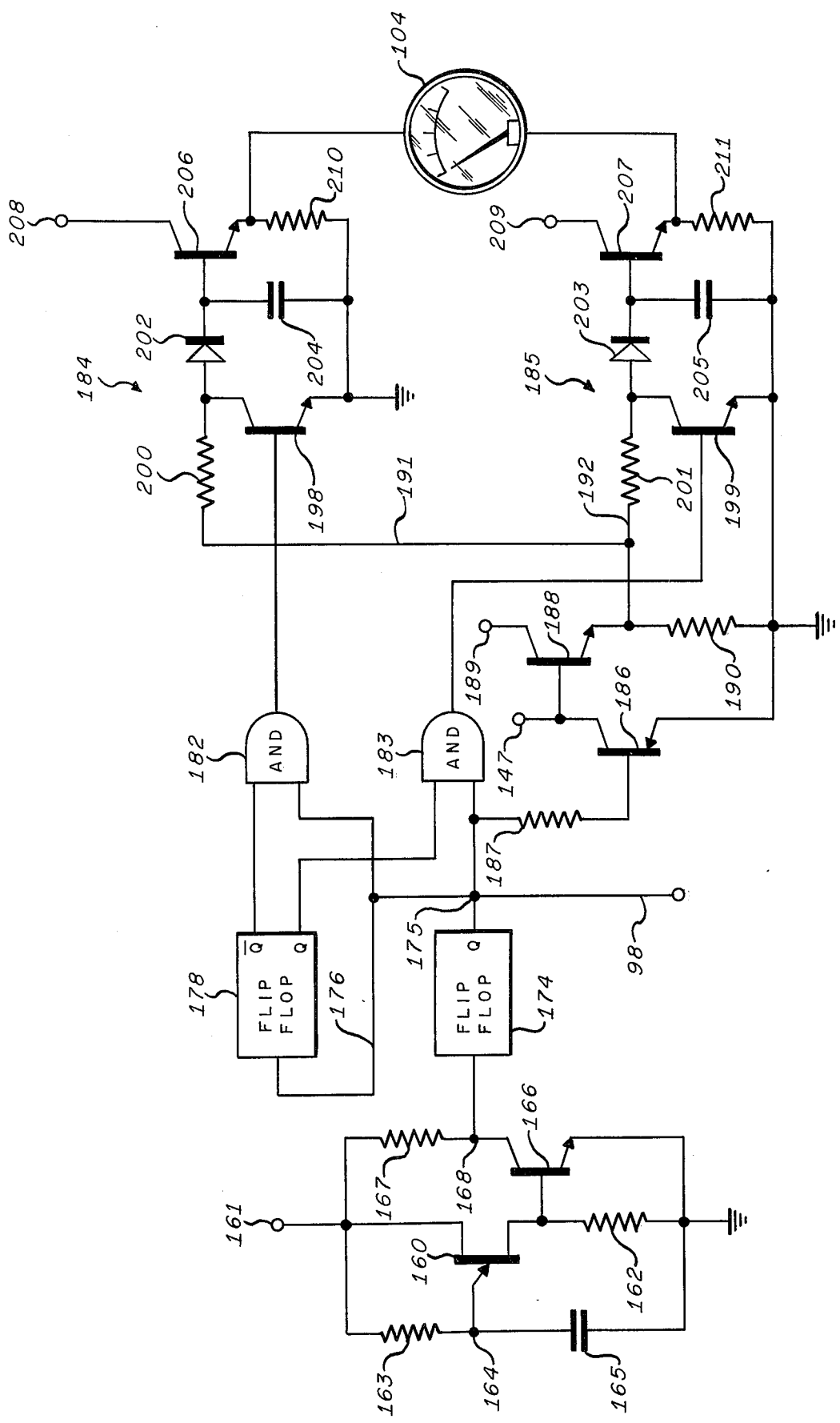
FIG. 9 is a wiring diagram illustrating a variation of the embodiment of FIG. 6.

A further compensating function may be performed by the configuration of FIG. 9. Referring to FIGS. 7 and 8, it will be seen that the effect now to be compensated arises because of the finite time constant of sensor 88 of FIG. 6 which causes the wave form at junction 147 to be that of FIG. 8, rather than the ideal generally rectangular wave form of FIG. 7. The circuit of FIG. 9 is useful in providing a highly precise linear output, in that compensation for the finite time constant of sensor 88 is provided. The FIG. 9 embodiment will be seen to provide a phase demodulation signal which samples the repeating wave only after each transient caused by the finite time constant of sensor 88 has substantially ended.

In FIG. 9, a conventional free running oscillator circuit is associated with unijunction transistor 160 having its base 1 electrode connected to a source of power (not shown) at terminal 161 and its base 2 electrode connected through resistor 162 to ground. Connected between terminal 161 and ground is a series circuit comprising a resistor 163, a junction 164, and a capacitor 165, junction 164 being coupled to the emitter electrode of the unijunction transistor 160. The output of the free running oscillator, which has a period slightly greater than the time constant of thermistor 88, is coupled from base 1 electrode of transistor 160 to the base electrode of transistor 166, whose emitter and collector electrodes are coupled in series relation with resistor 167 and output terminal 168 between power supply terminal 161 and ground. The output wave form is shaped by transistor 166 and resistor 167 to form the train of relatively short square pulses 172 shown in FIG. 10.

Figure 10:
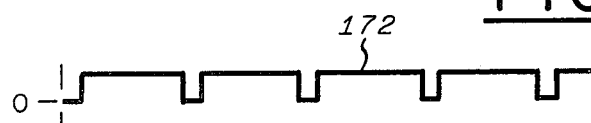
FIGS. 10 through 16 are graphs showing wave forms useful in explaining operation of the invention.
Figure 11:
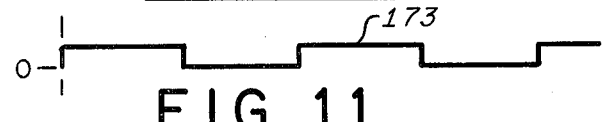
Figure 12:
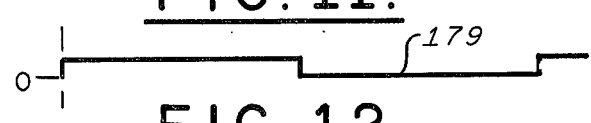
Figure 15:
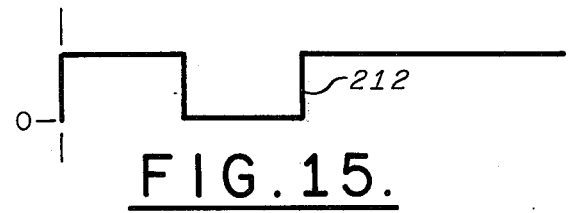
Figure 16:
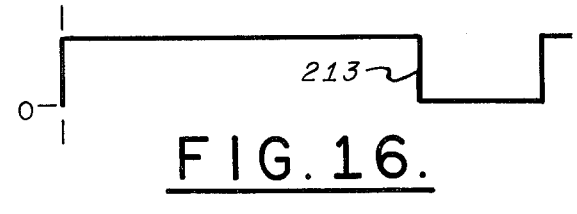

The pulse train 172 of FIG. 10 is coupled to flip flop 174 to form the regular square wave 173 of FIG. 11 at junction 175 on branching connectors 98 and 176. Connector 176 couples wave 173 to the second flip flop 178, which latter serves to halve the frequency of pulse wave 173 to form wave 179 of FIG. 12. The pulse train of wave 179 is coupled by lead 98 of FIG. 6 to control switch 97. The $\bar{Q}$ output of flip flop 178 is coupled to one input of the AND gate 182. The Q output of flip flop 178 is coupled to one input of AND gate 183. The Q output of flip flop 174 is coupled to the remaining second inputs of both AND gate 182 and AND gate 183. The outputs of AND gates 182 and 183 (pulse trains 212 and 213 of the respective FIGS. 15 and 16) are then respectively used to control the operation of gating channel circuits 184 and 185.

Figure 14:
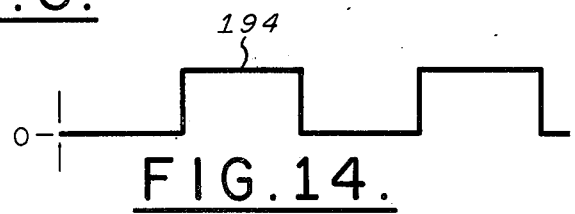
Figure 13:
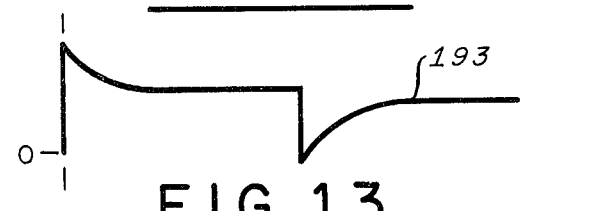

To effect the desired compensation, the wave at junction 147 of FIG. 6 is coupled into FIG. 9 via that junction 147 to the collector of a switching transistor 186; the gating voltage formed by flip flop 174 at its Q output is coupled through resistor 187 to the base of transistor 186, while its emitter is coupled to ground. Thus, the voltage wave at terminal 147 is periodically coupled to ground through transistor 186 under control of flip flop 174. The signals when not coupled to ground are amplified by the conventional emitter follower transistor stage involving transistor 188, power terminal 189, and resistor 190 coupled to ground. The amplified signal is coupled via branching leads 191, 192 to the respective gating stages 184, 185. In this maannier, the unwanted transient portions of the wave 193 of FIG. 13 at terminal 147 of FIG. 6 are shunted to ground, yielding the compensated wave train 194 of FIG. 14.

The output wave 212 of AND gate 183 is coupled to the base of gating transistor 198, lead 191 is coupled to its collector through resistor 200, and its emitter is connected to ground. Coupled to the collector and emitter electrodes of transistor 198 is a conventional peak detector circuit comprising diode 202 and capacitor 204. The peak detected signal is amplified by a conventional circuit consisting of emitter follower transistor stage 206 with its associated power terminal 208 and emitter resistor 210 and the amplified output is fed to one connection of a display or meter 104 which may be similar to meter 104 of FIG. 5.

In a similar manner, the output wave 213 of AND gate 183 is coupled to the base of gating transistor 199, lead 192 is coupled to its collector through resistor 201, and its emitter is coupled to ground. Coupled to the collector and emitter electrodes of transistor 199 is a second conventional peak detector circuit comprising diode 203 and capacitor 205. The peak detected signal is again amplified by a conventional amplifier consisting of emitter follower transistor stage 207 with its associated power terminal 209 and emitter resistor 211. The amplified output is coupled to the second input connection of meter 104.

Accordingly, it is seen that the invention provides novel calorimetrically sensitive bridge measurement arrangements for providing read outs which are intrinsically a linear function of power, either in the form of analog or digital displays, and avoiding the use of non-linear circuits found necessary in the prior art. Sensitive bridges are provided in which bridge re-balance is effected by control of the duty cycle of power pulses applied across the bridge. The invention provides means for measuring the energy dissipation constant of a thermally sensitive resistor by periodically changing the temperature of the sensing element between two levels, both of which may be finite.

While the invention has been described in its preferred embodiments, it is to be understood that the words which have been used are words of description rather than of limitation and that changes within the purview of the appended claims may be made without departure from the true scope and spirit of the invention in its broader aspects.

I claim:
1. Measurement apparatus comprising:
   multiple arm bridge circuit means having in one arm first and second impedance means,
      said first impedance means being sensitive to an effect to be measured,
      said second impedance means being cyclically variable between first and second values,
   low pass amplifier means responsive to the state of balance of said bridge circuit means,
   feed back means responsive to said low pass amplifier means for resetting the balance of said bridge circuit means,
   display means,
   synchronizer means for cyclically switching said second impedance means between said first and second values,
      said synchronizer means being further adapted synchronously to couple and decouple capacitive means responsive to said low pass amplifier means to said display means.

2. Apparatus as described in claim 1 wherein said first impedance means comprises a thermal sensor and said bridge includes second, third, and fourth impedance arms.

3. Apparatus as described in claim 2 wherein said low pass amplifier means comprises:
   low pass circuit means responsive to the state of balance of said bridge circuit means, and
   astable pulse generator means responsive to said low pass circuit means for producing a variable duty cycle pulse train.

4. Apparatus as described in claim 3 wherein said low pass circuit means comprises differential amplifier means.

5. Apparatus as described in claim 3 further including saturating amplifier means coupled in series relation between said astable generator means and said feed back means.

6. Apparatus as described in claim 3 further including means for sampling each pulse of said pulse train supplied to said display means only after each transient caused by the finite time constant of said first impedance means has substantially ended.

\* \* \* \* \*